…

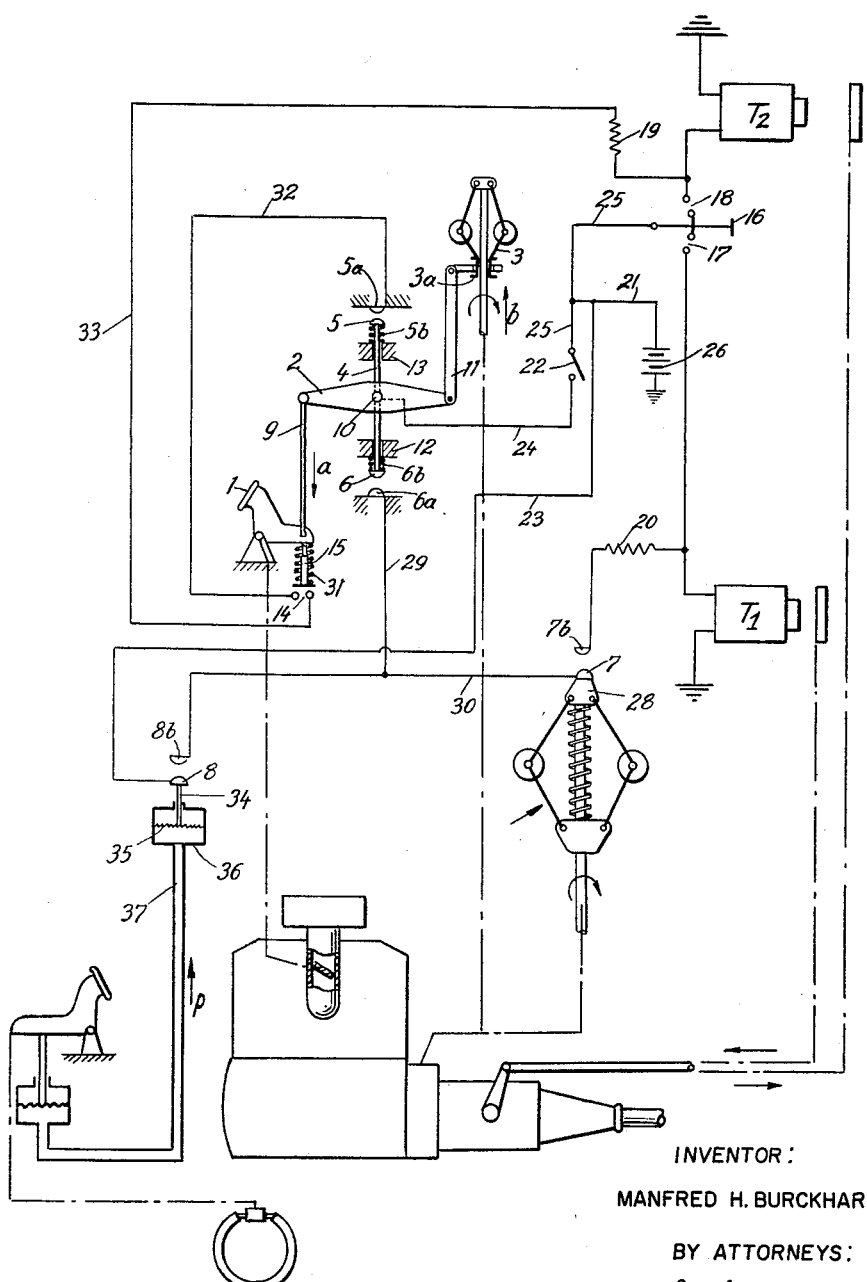

United States Patent Office 2,927,475
Patented Mar. 8, 1960

2,927,475

CONTROLLER FOR AN AUTOMATIC MOTOR VEHICLE TRANSMISSION

Manfred H. Burckhardt, Stuttgart-Oberturkheim, Germany, assignor to Daimler-Benz Aktiengesellschaft, Stuttgart-Unterturkheim, Germany Application April 2, 1957, Serial No. 650,268

Claims priority, application Germany April 4, 1956

7 Claims. (Cl. 74—472)

My invention relates to a controller for an automatic motor vehicle transmission and, more particularly, to a controller for producing alternative controlling impulses causing an increase or a reduction of the drive ratio of the transmission.

Automatic transmissions adapted for co-operation with a controller of that type are well known in the art. The "Media"—transmission, for instance, manufactured by the Zahnradfabrik Friedrichshafen at Friedrichshafen, Germany, is equipped with a ratio-changing motor which when put in operation by a ratio-increasing impulse will set up the transmission successively for higher ratios of transmission (referred to as upward shifting operation hereinafter) and when put in operation by a ratio-reducing impulse will automatically set up the transmission successively to lower ratios (referred to as downward shifting operation hereinafter). The change of ratios in this transmission is effected by engagement and disengagement of mechanical friction clutches. My novel controller is applicable to such automatic motor vehicle transmissions in which the change of the drive ratio is effected by electrical, hydraulic, pneumatic or other impulses.

It is an object of my invention to provide an improved controller of the kind heretofore explained which so controls the transmission as to automatically produce a braking couple with the aid of the engine upon actuation of a brake pedal.

It is another object of my invention to provide an improved controller which, if desired, may be arbitrarily actuated by the driver if he desires to override the automatic function of the transmission and to change the drive ratio of transmission at his option.

Moreover, it is an object of my invention to provide an improved controller for an automatic vehicle transmission which is effective under any travel conditions of the vehicle during the upward shifting operation as well as during the downward shifting operation to thereby enhance the economy of operation of the vehicle and the efficiency of the engine.

Finally, it is an object of the present invention to provide precautions preventing the transmission from being automatically shifted to a higher speed when the vehicle is coasting downhill or from being automatically shifted to a lower speed when the engine is rotating at a high speed exceeding a predetermined limit.

Further objects of my invention will appear from a detailed description of a preferred embodiment thereof with reference to the accompanying drawing. It is to be understood, however, that my invention is in no way limited to the details of such embodiment but is capable of numerous modifications within the scope of the appended claims and that the terms and phrases used in such detailed description have been chosen for the purpose of explanation rather than that of restriction or limitation of the invention.

In the drawing a circuit diagram of an electrical controller for an automatic motor vehicle transmission is shown, such transmission being of the type which will be set to a lower drive ratio by an electrical impulse supplied to a first terminal and will be set to a higher drive ratio by an electrical impulse supplied to a second terminal. The two terminals are diagrammatically indicated at T1 and T2.

The preferred electrical form of controller illustrated in the drawing includes a movable member, such as a rod 4 guided for longitudinal displacement in suitable openings of casing walls 12 and 13 to be movable between a first position and a second position. Moreover, the controller includes a first switch mounted for actuation by the movable member 4 in said first position and connected to the first terminal T1. In the embodiment shown this first switch is formed by a pair of cooperating contacts 6 and 6a. The contact 6 is secured to one end of the rod 4, whereas the contact 6a is carried by a bracket fixed to the casing 12, 13 and suitably connected by electrical conduits to the terminal T1. When this first switch 6, 6a is actuated by the rod 4, an electrical impulse will be supplied to the first terminal T1 whereby a lower drive ratio will be set up in the transmission.

Moreover, a second switch composed of contacts 5 and 5a is mounted for actuation by the movable member 4 in the second position thereof. While the contact 5 is carried by the end of the rod 4, the contact 5a is carried by a suitable bracket secured to the casing 12, 13 of the controller and is connected by suitable conductors to be described later with the second terminal T2. When the switch 5, 5a is actuated a controlling impulse will be supplied to the second terminal T2 whereby the transmission will be set up to a higher drive ratio. The rod 4 carries a pivot pin 10 extending transversely thereto, a differential connector preferably formed by a two-armed lever 2 being fulcrumed on the pivot pin 10.

The controller further includes a centrifugal speed measuring device 3 which is geared to the engine of the vehicle and includes a movable part 3a which is responsive to variations of the speed of the engine. When the engine is sped up, the part 3a moves in the direction of the arrow b. When the engine is slowed down, the part 3a moves in the opposite direction. A link 11 connects the part 3a with one arm of the differential connector 2. The other arm thereof is connected by a link 9 with the accelerator pedal 1 of the vehicle. Springs 5b and 6b each inserted between one of the contacts 5, 6 and the associated casing wall 13, 12 tend to restore the movable member 4 to its central position. These walls consist of an insulating material, whereas the movable member 4 consists of a conductive material, such as metal. The member 4 is electrically connected by a flexible cable 24, a switch 22, a wire 25, and a wire 21 to one terminal of an electrical battery 26, the other terminal of which is grounded.

Preferably the controller is equipped with a pair of safety switches 7, 7b and 14, the first safety switch 7, 7b being included in the electrical connection of the contact 6a with the terminal T1 to thereby interrupt the electrical connection, when open. This safety switch 7, 7b is actuated by suitable means responsive to the engine speed, such as a centrifugal device 27 which is geared to the engine of the vehicle. This device includes a member 28 which is lifted to close the switch 7, 7b when the engine speed drops below a certain limit and is lowered to open the switch 7, 7b when the engine speed increases beyond such limit. The connection of the contact 6a with the terminal T1 is formed by a wire 29, a wire 30, the switch 7, 7b, and an electrical resistor 20, the purpose of which will be explained later.

The second safety switch 14 comprises a pair of contacts and a bridge member 15, which is connected with the accelerator pedal 1 by a helical spring 31. The bridge member 15 is lifted from the contacts 14 thus opening the second safety switch, unless the accelerator pedal 1 is more or less depressed. Hence, when the accelerator pedal is in its resting position, the second safety switch 14 is open. One of the contacts 14 is connected by a wire 32 with the contact 5a whereas the other contact 14 is connected by a wire 33 to a resistance 19 which in its turn is connected by a suitable conductor with the terminal T2.

The controller further includes a switch composed of a fixed contact 8b and a movable contact 8 operable in response to an actuation of a vehicle brake. The fixed contact 8b is connected by the wire 30, the switch 7, 7b and the resistor 20 to the terminal T1.

The movable contact 8 may be connected by a rod 34 with a diaphragm 35 subjected to the liquid pressure $p$ prevailing in the braking cylinders of the vehicle, the diaphragm 35 confining a space in a housing 36 connected with the braking cylinders by a pipe 37.

Preferably the controller further includes a manually operable selector switch 16 including a contact arm optionally movable into an upper position or into a lower position and connected with the wire 25. This arm may engage either a contact 18 connected to the terminal T2 or a contact 17 connected to the terminal T1.

The operation of the electrical controller is as follows: When the vehicle is at rest and the engine is idling the part 3a of the centrifugal speed measuring device 3 is in its lowermost position and the accelerator pedal 1 is in its resting position as shown. As a result, the movable member 4 assumes its first position in which the switch 6, 6a is closed and establishes a circuit extending from the battery 26 through the wires 21, 25, switch 22 (now closed), wire 24, member 4, first switch 6, 6a, wire 29, wire 30, first safety switch 7, 7b (now closed), resistor 20 and terminal T1. The impulse thus produced will set the transmission to its lowermost speed ratio.

When the operator wishes to start the vehicle, he will slightly depress the accelerator pedal 1 through a distance permitted by the lost motion in the linkage to thereby open the throttle of the engine. As a result, the engine will be sped up and the part 3a will be lifted thus permitting a further depression of the accelerator pedal 1. Moreover, the second safety switch 14, 15 will be closed. When the engine speed reaches a limit that depends on the amount of depression of the accelerator pedal 1, the second switch 5, 5a will be closed and will establish a circuit extending from the battery 26 through the conductors 21, 25, switch 22, conductor 24, movable member 4, second switch 5, 5a, conductor 32, second safety switch 14, conductor 33 and resistor 19 to the terminal T2, whereby the ratio of transmission will be increased. The consequential reduction of the engine speed will cause the centrifugal speed measuring device 3 to lower the part 3a and to thereby open the second switch 5, 5a again. Hence, the drive ratio of the transmission will not be changed, unless further depression of the accelerator pedal 1 should result in another increase of the engine speed causing a repeated energization of the terminal T2 to effect a further increase of the speed ratio. A more powerful depression of the accelerator pedal 1 will increase the distance between the contacts 5 and 5a and, therefore, the impulse for the upward shifting operation will not be produced until the engine speed reaches a higher limit resulting in a correspondingly larger lift of part 3a. Hence, it will appear that when the accelerator pedal is farther depressed, the ratio increasing impulse will be produced when the engine speed exceeds a higher speed limit. When the driver keeps the engine throttled, the drive ratio increasing operation will be effected when the engine speed exceeds a lower limit, so that the vehicle will be driven with a higher drive ratio and a consequent lower fuel consumption.

When the driver while travelling at a moderate speed wishes to accelerate the vehicle and fully depresses the accelerator pedal 1, the movable member 4 will be moved to its first position closing the first switch 6, 6a. This will have no effect, when the engine speed exceeds the limit at which the first safety switch 7, 7b is opened. If the engine speed is lower than said limit, however, a speed ratio lowering impulse will be applied to the terminal T1, thus enabling the engine to exert a powerful driving torque on the driven wheels of the vehicle for high acceleration thereof.

When the vehicle is being driven downhill with the accelerator pedal 1 being in its normal position shown, the coasting vehicle will exert a driving torque upon the engine accelerating the same and the part 3a will be lifted accordingly closing the second switch 5, 5a. The second safety switch 14, 15 which is open under these conditions constitutes a means operative when the accelerator lever is in resting position to render the movable means 4 ineffective to produce a ratio-increasing impulse because no such impulse can be transmitted on account of the interruption of the connection of the wires 32 and 33 by the open switch 14, 15. The second safety switch 14, 15, however, will not render the movable means 4 ineffective to produce a ratio-reducing impulse when the speed of the engine drops again or when the driver depresses the accelerator pedal.

When the driver wishes to override the controlling effect of the movable member 4 and to shift the transmission independently thereof he may manipulate the selector switch 16 closing either the contact 17 for reducing the drive ratio or closing contact 18 for increasing the drive ratio. When the contact 17 is closed a circuit will be established from the battery 26 through the wires 21 and 25 and the contact 17 directly to the terminal T1. When the switch 18 is closed, it will establish a circuit extending from the battery 26 via the wires 21 and 25 and the switch 18 directly to the terminal T2. It is the function of the resistors 19 and 20 to enable the switches 17 and 18 to override the controlling effect of the switches 5, 5a and 6, 6a. Owing to the provision of the resistors 19 and 20 the current supplied by the battery will no longer pass through the wire 24 via the switch 22, the movable member 4 and the switches cooperating therewith since the current will prefer the path of least resistance leading via the switches 17 and 18 from the battery to the terminal T1 or T2.

When the operator wishes to brake the vehicle and depresses the brake pedal, the movable contact 8 will be lifted and will contact the stationary contact 8b establishing a circuit leading from the battery 26 through wire 21, a wire 23, movable contact 8, stationary contact 8b, wire 30, first safety switch 7, 7b and resistor 20 to the terminal T1 thereby reducing the drive ratio of transmission, thus increasing the braking couple exerted by the engine upon the driven wheels of the vehicle.

The movable contact 7, however, constitutes an engine speed-responsive element rendering the means 8, 8b responsive to actuation of the brake ineffective to produce a ratio-reducing impulse when the engine speed exceeds a certain limit.

When the driver wishes to disable the automatic control function of the movable member 4 he may open the switch 22. In so doing he will not render the brake switch 8, 8b ineffective because current is supplied to the movable contact 8 independently of the position of the switch 22.

From the above description of a preferred embodiment of my novel controller it will appear that this controller avoids the disadvantage of prior automatic transmissions which fail to reduce the drive ratio when the brake is actuated so that no automatic braking with the aid of the engine can be practiced. Also, it will appear that my novel controller enables the driver to change the drive ratio of the transmission at his option, when he so desires, without interference by the automatic function of the controller. The possibility of braking the vehicle with the aid of the engine is of particular importance for heavy duty vehicles, such as trucks and buses, which when driven downhill cannot be effectively braked unless the engine contributes to the braking effect.

Thus my novel controller is effective under any conditions of operation of the vehicle and will considerably enhance the economy of operation. The automatic drive ratio-changing impulse is produced in dependence on both the position of the accelerator pedal and the speed of the engine. When the accelerator pedal is but slightly depressed the ratio-changing impulse will be produced at a lower engine speed than with a more powerful depression of the accelerator pedal. This means that when the driver throttles the engine the drive ratio of the transmission will be changed at a much earlier time so that the vehicle will be driven with a higher drive ratio and consequent lower fuel consumption than under conditions in which the accelerator pedal is depressed to a larger extent. This operation has the effect that when the driver steps the accelerator pedal down all the way, the drive ratio will not be increased until the engine has nearly reached its maximum speed, as is desirable for a powerful acceleration of the vehicle. A reduction of the drive ratio will only be effected as long as the engine speed is below the limit at which the first safety switch is opened. Therefore, when the driver wishing to accelerate the vehicle depresses the accelerator pedal all the way, the drive ratio will be reduced to the next lower speed, provided, the engine speed is below a certain limit. Otherwise the electrical circuit for applying the ratio-reducing impulse will be interrupted by the first safety switch.

Additional means may be provided for preventing an automatic reduction of the drive ratio of the transmission when the latter is set to its second gear position. This has the effect of excluding the first gear and the second gear from the automatic control so that the transmission, when the vehicle is started under automatic control will be in the second gear position or even in the third gear position. This may require the inclusion in the transmission of a hydro-dynamic torque converter facilitating the starting operation. In this event the first gear position and the second gear position as well as the reverse gear position can be rendered effective by manipulation of a suitable control element, such as the manually operable selector switch 16. A brake actuation results in a reduction of the drive ratio of transmission owing to the effect of the switch 8, 8b responsive to the liquid pressure prevailing in the braking cylinders of the vehicle. The ratio-reducing impulse will not become effective, however, unless the engine speed is below the limit to which the first safety switch responds.

Another important feature of my invention is the provision of the novel controller with means, such as the second safety switch 14, 15, that is operable by the accelerator lever and operative when the same is in resting position to render the movable means 4 ineffective to produce a ratio-increasing impulse. When the vehicle is coasting downhill the accelerator pedal is left in its resting position. In this event an automatic increase of the ratio of transmission is rendered impossible, when the speed of the engine increases. It follows that on travel downhill the ratio of transmission will not be changed, thus insuring that the braking effect of the engine will not be reduced. Upon a reduction of the engine speed or upon an actuation of the brake, however, the drive ratio of the transmission will be reduced automatically irrespective of the position of the second safety switch 14, 15.

When it becomes necessary for the driver in order to cope with suddenly occurring requirements of traffic to rapidly change the drive ratio at his option independently of the automatic control he may do so by manually operating the selector switch, such as 16. The impulse power of the automatic means is so reduced by the electrical resistors 19 and 20 inserted in the electrical circuit that a manually produced impulse will override the automatic function and will change the drive ratio of the transmission.

If desired, the driver may disable the automatic means altogether by manipulation of a suitable control element, such as switch 22. This will not disable the automatic controlling effect produced by the brakes which is preferably maintained for the reason of safety of operation.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. A controller for an automatic motor vehicle transmission comprising movable means for producing controlling impulses causing an increase or a reduction of the drive ratio of the transmission, speed measuring means for measuring the speed of the vehicle engine, an accelerator pedal and pedal-responsive means movable by said accelerator pedal, a differential connector connecting said movable means with said speed measuring means and said pedal responsive means to cause the controlling impulse to be given in dependence on both the speed of the engine and the position of said accelerator pedal, said differential connector being connected with said movable means for addition of the effects on said movable means of a reduction of said speed of said engine and of a depression of said pedal, further comprising an engine speed-responsive element coordinated to said movable means to render said movable means ineffective to produce a ratio-reducing impulse when said speed exceeds a predetermined limit.

2. The controller claimed in claim 1 for a transmission selectively settable to at least a first speed ratio and a second speed ratio further comprising locking means for preventing said transmission from being shifted from said second ratio to said first ratio.

3. The controller claimed in claim 1 further comprising means responsive to actuation of a vehicle brake for producing a controlling impulse causing the drive ratio of the transmission to be reduced and an engine speed-responsive element rendering said last-mentioned means ineffective to produce a ratio-reducing impulse when said speed of said engine exceeds a predetermined limit.

4. The controller claimed in claim 1 further comprising means operable by the accelerator pedal and operative when the same is in resting position to render said movable means ineffective to produce a ratio-increasing impulse.

5. The controller as claimed in claim 1 further comprising manually operable means for producing a controlling impulse causing a change of the drive ratio of the transmission and means enabling said manually movable means when manipulated to override the effect of said movable means.

6. The controller as claimed in claim 1 further comprising an element responsive to actuation of a vehicle brake for producing a drive ratio reducing impulse and manually operable means for disabling said movable means without disabling said element.

7. An electrical controller for an automatic vehicle transmission of the type settable to a lower drive ratio by an electrical impulse supplied to a first terminal and settable to a higher drive ratio by an electrical impulse supplied to a second terminal, said controller comprising a movable member movable between a first position and a second position, a first switch mounted for actuation by said movable member in said first position and connected to said first terminal to be operative when actuated to supply an impulse to said first terminal, a second switch mounted for actuation by said movable member in said second position and connected to said second terminal to be operative when actuated to supply an impulse to said second terminal, a differential two-armed connector pivotally connected with said movable member, a centrifugal speed measuring device geared to the engine of the vehicle and including a movable part responsive to variations of the speed of the engine and connected with one arm of said connector, an accelerator pedal connected with the other arm of said connector, a switch operable in response to an actuation of a vehicle brake and connected to said first terminal to apply an electrical impulse thereto upon brake actuation, a first safety switch for interrupting the connection of said first terminal with said aforementioned switches, means responsive to the engine speed for opening said first safety switch when said engine speed exceeds a certain limit, a second safety switch coordinated to said accelerator pedal to be opened in the resting position thereof for interrupting the connection of said second terminal with said second switch, a manually operable selector switch connected to said terminals for selectively supplying impulses thereto, and electrical resistances inserted in the connections of said terminals with said first switch and with said second switch.

References Cited in the file of this patent

UNITED STATES PATENTS

| | | |
|---|---|---|
| 2,375,440 | Roche | May 8, 1945 |
| 2,440,558 | Price | Apr. 27, 1948 |
| 2,671,351 | Nerocher | Mar. 9, 1954 |
| 2,719,436 | Nallinger | Oct. 4, 1955 |
| 2,768,534 | Orr | Oct. 30, 1956 |